US008542255B2

(12) United States Patent
Bhatt

(10) Patent No.: US 8,542,255 B2
(45) Date of Patent: Sep. 24, 2013

(54) ASSOCIATING MEDIA CONTENT ITEMS WITH GEOGRAPHICAL DATA

(75) Inventor: Nikhil Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 936 days.

(21) Appl. No.: 12/641,243

(22) Filed: Dec. 17, 2009

(65) Prior Publication Data

US 2011/0148936 A1 Jun. 23, 2011

(51) Int. Cl.
*G09G 5/00* (2006.01)
(52) U.S. Cl.
USPC .......................................... 345/676; 386/241
(58) Field of Classification Search
USPC .......................................... 345/676; 386/241
See application file for complete search history.

(56) References Cited

U.S. PATENT DOCUMENTS 6,023,241 A 2/2000 Clapper
6,741,790 B1 5/2004 Burgess
2007/0255496 A1 11/2007 Fong et al.
2008/0025561 A1 1/2008 Rhoads et al.
2009/0132941 A1 5/2009 Pilskalns et al.

OTHER PUBLICATIONS

O'Connor "A Content-based Retrieval System for UAV-like Video and Associated Metadata"; Airborne Intelligence, Surveillance, Reconnaissance (ISR) Systems and Applications V edited by Daniel J. Henry, Proc. of SPIE vol. 6946, 69460I, (2008) • 0277-786X/08/ $18 • doi: 10.1117/12.777527; pp. 1-3, 8.*

* cited by examiner

*Primary Examiner* — Maurice L McDowell, Jr.
(74) *Attorney, Agent, or Firm* — Fish & Richardson P.C.

(57) ABSTRACT

Systems and techniques are disclosed for associating and presenting media content items with locations on a geographical track path. For example, the frames of a video segment can be associated with locations on a track path. The track path can be based on position data, including position coordinates and a corresponding time coordinates, obtained while the video frames were captured. Locations for the video frames can be determined based on a start time of the video segment, a frame rate of the video segment, and the position data. The video segment can be displayed with user controls that enable a user to manipulate the frame of the video segment being displayed including a time indicator and a location indicator displayed on the track path.

25 Claims, 6 Drawing Sheets

ASSOCIATING MEDIA CONTENT ITEMS WITH GEOGRAPHICAL DATA

TECHNICAL FIELD

This disclosure relates to presenting digital media, for example, digital photographs, digital video, and the like.

BACKGROUND

Digital photography and digital videography have simplified taking, viewing, storing, and reproducing media content such as still images and video. Photographs can be taken either using high-end equipment such as digital single lens reflex (SLR) cameras, low resolution cameras including point-and-shoot cameras and cellular telephone devices with suitable capabilities. Video can be taken either using high-end professional equipment, hand held cameras such as a camcorders, digital video cameras, and cellular telephone devices with suitable capabilities. Photographs and video can be transferred from one location to another location such as from one data storage device to another data storage device, or from one location on a data storage device to another location on a data storage device.

Software applications can be used to store, display, and edit digital media content obtained from a camera, video camera, or any other electronic image in a digital format. Such software applications provide a user in possession of a large repository of digital media content with the capabilities to organize, view, and edit photographs and video

SUMMARY

This document describes systems, methods, and techniques for associating and presenting media content items with locations on a geographical track path. For example, a geographical track path can be determined based on geographical track data (position coordinates and time coordinates) obtained, for example, from a global positioning system ("GPS") tracking device while the media content items were captured. The media content items can be associated with locations along the track path based on the times of capture of the respective media content items. A presentation can be displayed, in a user interface, of the media content items in a series based on their associated locations on the track path.

User controls, including a location marker and a time marker, can be provided in the user interface that enable a user to manipulate the presentation. As the presentation is displayed, the location marker is displayed on the track path and represents a location of capture on the track path of a media content item being displayed in the presentation. The time marker is also displayed and indicates a time in the presentation corresponding to the media content being displayed.

Manipulation of the location marker to a different location on the track path causes the media content item displayed in the user interface to change to a different media content item, i.e. a media content item captured at the different location, and causes the time marker to also change to a time in the presentation corresponding to the different media content item. Also, manipulation of the time marker to a particular time in the presentation causes the media content item displayed in the user interface to change to a different media content item that corresponds to the that particular time in the presentation and causes the location marker to move to a location along the track path associated with the location of capture of the different media content item.

In some examples, frames of a video segment can be associated with corresponding locations on a geographical track path. The track path is based on track data, for example, obtained from a GPS tracking device while the video segment was being captured with a video camera. A location on the track path for each of the frames can be determined by interpolating a position on the track path for a date and time of capture of a reference frame (e.g. the start frame) in the video segment. From the reference frame and its location on the track path, a location on the track path can be interpolated for the other frames based on the frame rate of the video camera.

The video segment can be displayed in a video window while the track path for the video segment is displayed on a map with a marker that represents the location on the track path of the frame being displayed. The marker moves along the track path as the video segment is played. The marker also moves along the track path as a user seeks through the video segment by manipulating, for example, a time marker associated with a frame time in the video segment.

Also, the location marker can be moved to a different location on the track path, which in turn causes the frame being displayed to change to a different frame, a frame that was captured at the different location, and causes the time marker to change to a frame time associated with the different frame. The different location can converted into a frame time based on the track data, the reference frame of the video segment, and a frame rate of the video segment.

Details of one or more implementations are set forth in the accompanying drawings and the description below. Other features, and advantages will be apparent from the description and drawings, and from the claims.

DESCRIPTION OF DRAWINGS

Like reference symbols in the various drawings indicate like elements.

DETAILED DESCRIPTION

Figure 1:
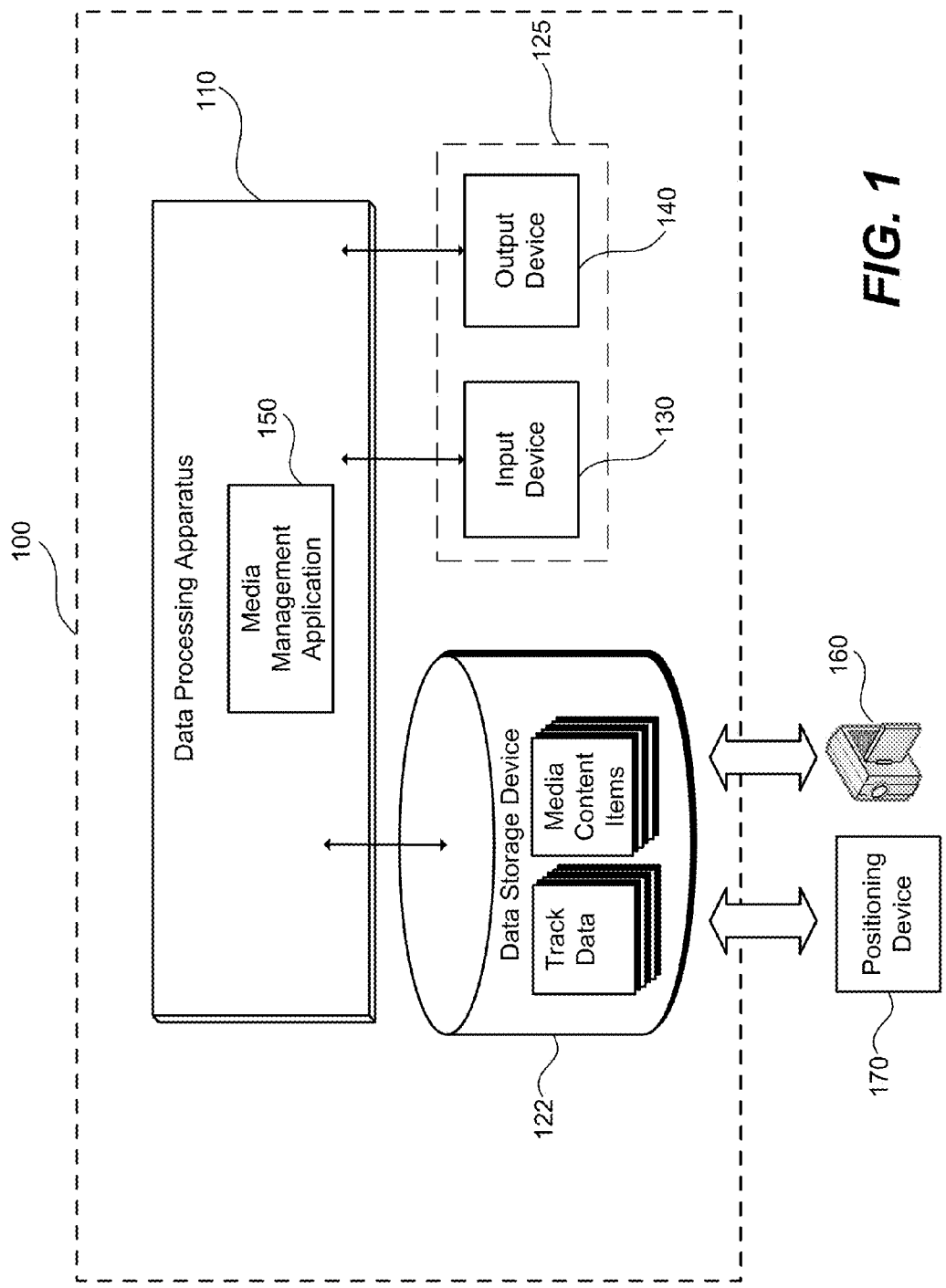
FIG. 1 is a schematic that shows an example of a system for associating and displaying media content items with geographical data.

FIG. 1 is a schematic that shows an example of a system 100 for associating and displaying media content items, such as video segments and digital images, with geographical data. The system 100 includes processor electronics 110, such as a data processing apparatus, communicatively connected to a data storage device 122 and to one or more user interface devices 125. The user interface devices 125 can include one or more input devices 130 (e.g. a mouse, a keyboard, etc.), and one or more output devices 140 (e.g. a display device, speakers, etc.). The data processing electronics 110 can also operate a media management application 150.

Media content items can be stored on the data storage device 122. For example, media content items stored on media capture device 160 (e.g. a digital video camera, digital camera etc.) can be uploaded to the data storage device 122 and displayed in the media management application 150. The media content items can be uploaded with time coordinates identifying a time of capture of the respective media content items by the media capture device 160. For a video segment, the time of capture can be associated with a reference frame, e.g. the time of capture of the first frame of the video segment. In some examples, the media content items can be uploaded with corresponding geographical data identifying a location where each media content item was captured. For a digital photograph, a position coordinate (e.g. a global positioning system ("GPS") coordinate), identifying where the picture was captured by media capture device 160, can be uploaded to the data storage device 122. For a video segment, a positioning coordinate for a reference frame (e.g. the first frame) in a video segment can be captured by the media capture device 160 and uploaded to the data storage device 122 with the video segment.

Also, geographical track data, e.g. in the form of track files, can be stored on the data storage device 122. For example, track data can be uploaded from a positioning device 170 to the data storage device 122. Example positioning devices include a GPS device, a GPS data logger, or a GPS dongle. Geographical track data can include a series of position coordinates identifying locations along a track and corresponding time coordinates that represent times when the position coordinates were recorded by the positioning device 170. Based on the geographical track data, a track path can be determined for a path of travel. For example, a user can have a positioning device 170 such as a GPS dongle that captures geographical track data for a path traveled by the user as the user captures media content items with a media capture device 160. The geographical track data for the path traveled by the user can be uploaded to the data storage device 122 and the media application 150 can display a track path on a map in a user interface corresponding to the path traveled by the user. In some examples, a media capture device can simultaneously capture both video content and track data. The video content and the track data can be uploaded to the data storage device 122 from the media capture device.

Also, the media management application 150 can determine a location on the track path for media content items, can determine a location of capture on the track path for frames of a video segment, and can locate a frame in a video segment for a given location on the track path. The media management application 150 can display the media content items in a display window while displaying a map with the track path corresponding to the media content items. For example, the media management application 150 can display a presentation of multiple media content items (or of a video segment) captured along a track path while displaying a location marker at a location on the track path associated with the location of capture of the displayed media content item (or of the displayed frame of the video segment).

Figure 2:
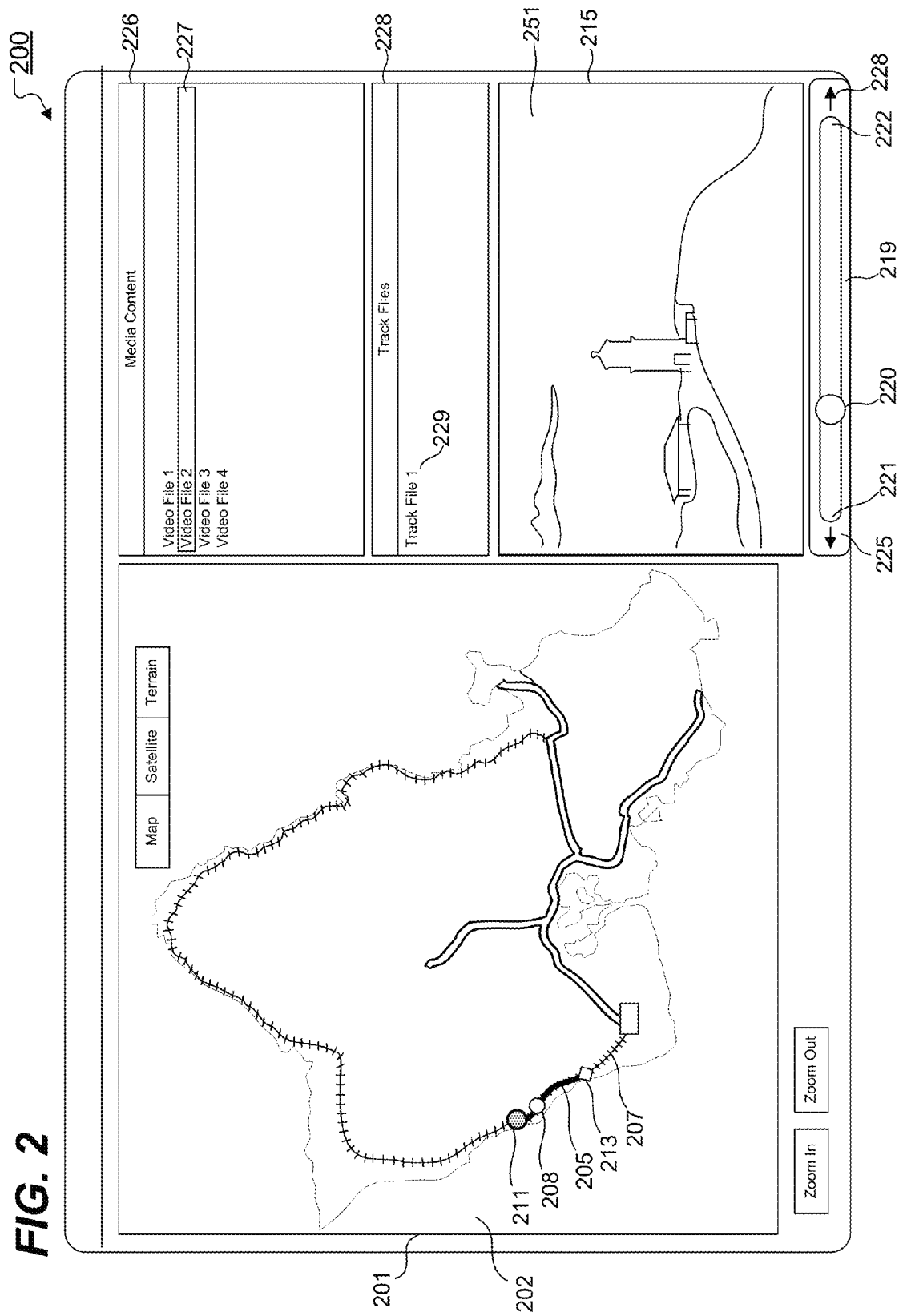
FIGS. 2-4 show a schematic of an exemplary user interface for displaying one or more media content items and an associated track path.
Figure 3:
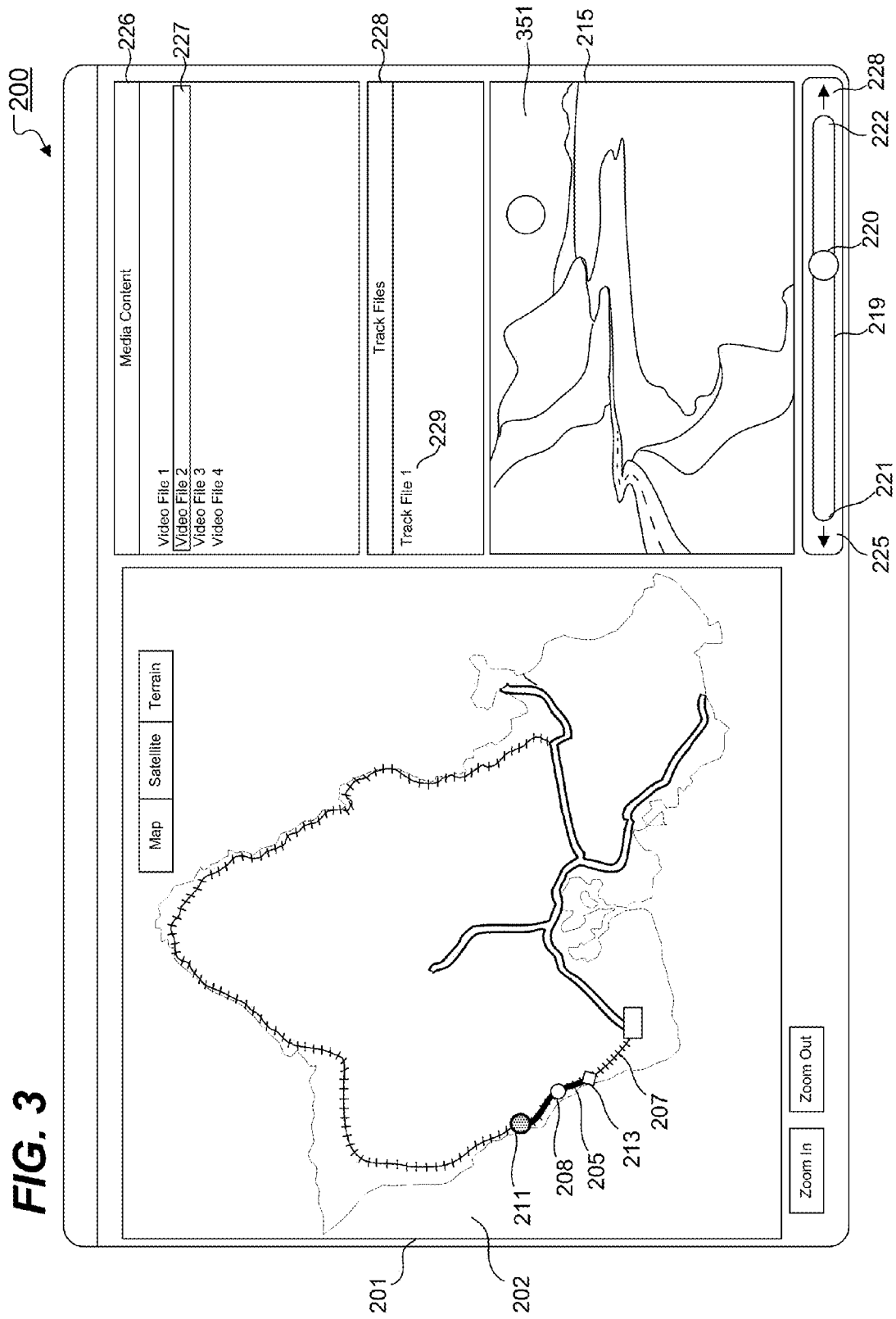
Figure 4:
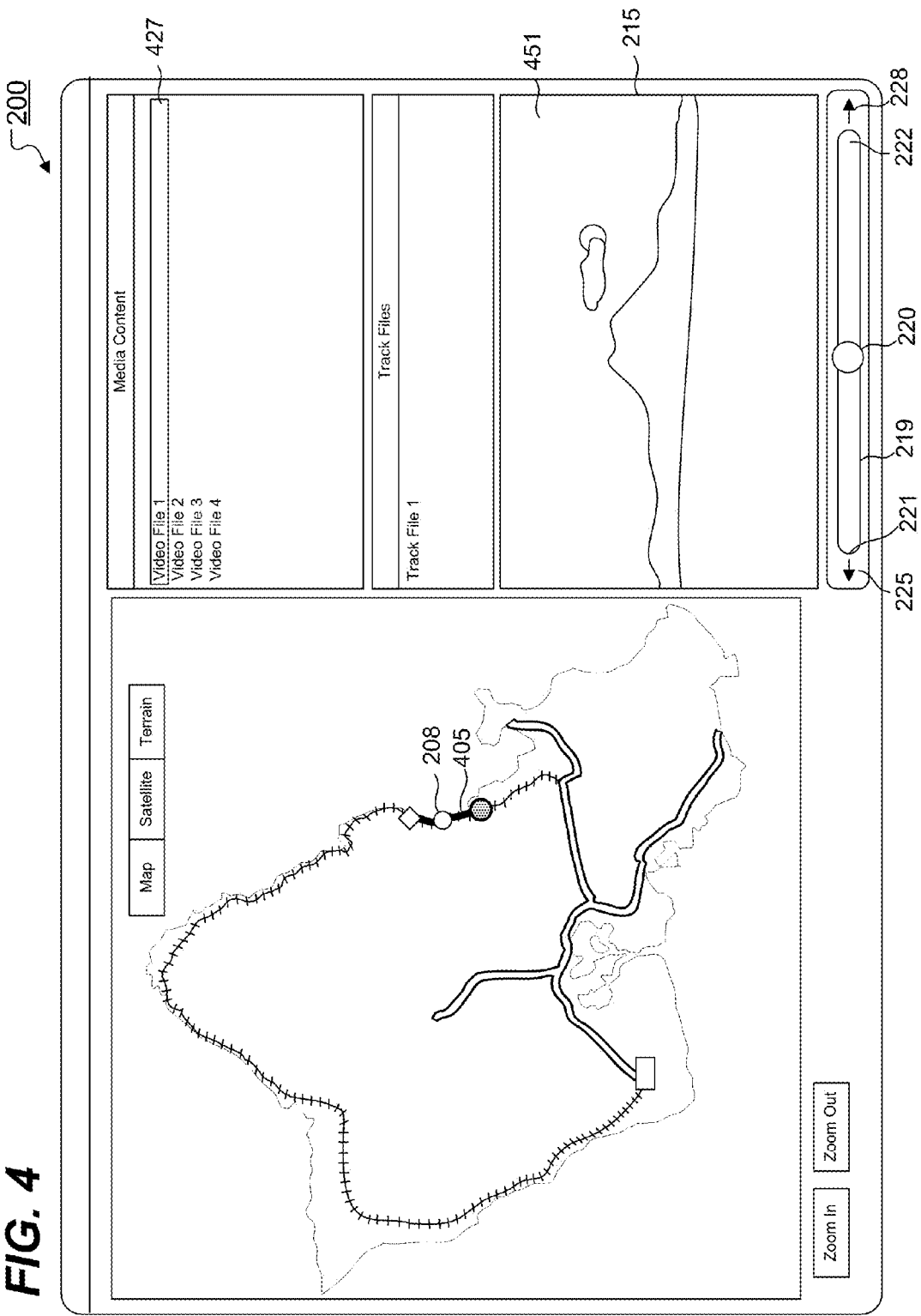

FIGS. 2-4 show a schematic of an exemplary user interface 200 for displaying one or more media content items and an associated track path. The user interface 200 can be displayed in a display device operatively coupled to a data processing apparatus. The following discussion of the user interface 200 is within the context of video content but also applies to other media content items (e.g. digital photos). The user interface 200 has a media display window 215 for displaying a media presentation such as a video or a series of media content items; a map window 201 for displaying a map 202; a media content window 226 that displays a list of selectable video files; and a track files window 228 that displays a track file (or files) corresponding to the video files listed in the media content window 226.

Four video files are listed in the media content window 226 with a selected video file 227 that contains a video segment. A frame 251 from the video segment in video file 227 is displayed in the media display window 215. The media display window 215 has slider 219 for indicating the time elapsed and the time remaining in the video segment. The slider 219 has a proximal end 221 and a distal end 222. A first marker 220 is displayed on the slider 219. The location of the first marker 220 on the slider 219 represents a frame time in the sequence of video frames for the video frame being displayed. As the video segment is played from the beginning, the first marker 220 advances from the proximal end 221 to the distal end 222 of the slider 219 according to the frame time of the video frame being displayed.

In FIG. 3, for example, a different video frame 351 than in FIG. 2 is shown in the media widow 215. Also, the first marker 220 is at a different location on the slider 219. As the video segment plays, the first marker 220 moves along the slider 219 to a frame time corresponding to the frame 351 displayed in FIG. 3.

A user can control the frame being displayed by navigating to a particular frame time within the video segment. A user can navigate by manipulating the first marker 220, e.g. by selecting and dragging the first marker 220 along the slider 219. A user can also manipulate the first marker 220 by selecting a rewind button 225 or by selecting a forward button 228. In FIG. 3, for example, the first marker can be manipulated from the frame time corresponding to the frame 251 displayed in FIG. 2 to the frame time corresponding to the frame 351 displayed in FIG. 3.

Also, the track files window 228 displays a track file 229, titled "Track File 1." The track file 229 includes geographical track data that represents a geographical track along which the four video files (displayed in the media content window 226) were captured. A track path 205, representing a location of capture for the frames of the video segment in the video file 227, can be determined from the geographical track data in the track file 229 based on a reference frame and a frame rate of the video segment. The reference frame (e.g. the start frame) can include reference data, such as a capture time (e.g. a start time) or a capture location. From the reference data and the frame rate, an absolute time for each of the frames, including the start frame and end frame, can be calculated. Based on that absolute time, a location of capture for each frame can be determined. Because the absolute time of each of the frames may not match-up exactly with the geographical track data (e.g. with the position coordinates and the corresponding time coordinates), a location on the track path can be interpolated for each of the frames based on the geographical track data.

Using the interpolated location of the start frame and an end frame of the video segment, the appropriate portion of the geographical track data can be selected from the track file 229 and used to display the track path 205 on the map 202. Accordingly, the track path 205, as displayed on the map, corresponds to the locations where the video frames in the video segment from video file 227 were captured. In this particular example, the video frames were captured from a train traveling on a train track 207.

In some examples, a track file and a corresponding video file initially may not have synchronized times. For example, a video capture device that captures the video file may be set to a different time zone than the device that captures the track file. Also, there may be a time offset between the capture device, such as a few seconds, if the devices are not synchronized prior to capture. When a user uploads a track file and/or a corresponding video file, the user can provide a timing offset so that the timing in the track file and the timing in the corresponding video file are synchronized. In some examples, the user can be prompted to input such information when the user attempts to upload a video file and/or a corresponding track file. Once the video file and the track file are synchronized, the application can connect the two automatically in subsequent user interactions. For example, if a user makes an altered video file, e.g. a video clip, from the original video file, the track file data associated with the altered video clip can be locate from the track file when the clip is used at a later time.

In some examples, multiple track files can be displayed in the track files window 228. When a user selects, a video file (or a digital photograph), e.g. from the media content window 226, a corresponding track file can be located using a reference frame of the selected video file (or using the capture time or location of the digital photograph). For example, using the capture time (or capture location) of a start frame, a track file can be found that has a corresponding time (or location) in its track data. When a track file has been located for the selected video file (or for a digital photograph), the track file can be displayed in the track files window 228. The track file can be displayed as if it had been selected, e.g. highlighted or outlined.

In some examples, a user can select a track file from multiple track files displayed in the track file window 228. The video files (and/or a digital photographs) displayed in the media content window 226 can be limited to video files (and/or a digital photographs) corresponding to the selected track file in the track file window 228. The corresponding video files (and/or a digital photographs) can be determined by matching reference frame data from the video files (or the capture time or location of the digital photograph) with track data in the selected track file.

The track path 205 has a start marker 211 and an end marker 213, representing the beginning and end of the track path. The track path also has a position marker 208 indicating a location of capture for a frame in the video segment being displayed in the media display window 215. As the video segment is played from the beginning, the location marker 208 advances along the displayed track path from the start marker 211 to the end marker 213 according to the location of the video frame being displayed in the media display window 215. For example, in FIG. 3 the location marker 208 is at a different location on the track path than in FIG. 2. As the video segment plays from the frame 251 in FIG. 2, the location marker 208 can move along the track path 205 to a location of capture corresponding to the frame displayed in FIG. 3.

A user can control the frame being displayed in the media display window 215 by navigating to a location on the track path. A user can navigate by manipulating the location marker 208, e.g. by selecting and dragging the location marker 208 along the track path 205. The position of the location marker 208 along the track path can be used to determine a corresponding frame for display in the video segment. From the geographical track data for the track path 205, a position coordinate and a time coordinate can be determined that correspond to the position of the marker 208. The time coordinate can be converted into a frame time based on the start time of the video segment and the frame rate of the video segment. Accordingly, manipulation of the location marker 208 to a location along the track path 205 can cause the frame in the media display window 215 to change and can cause the first marker 220 to move to a corresponding frame time along the slider 219. For example, in FIG. 3, the location marker 208 can be manipulated from a position corresponding to the frame 251 displayed in FIG. 2 to the position corresponding to the frame displayed 351 in FIG. 3. In turn, the first marker 220 can move to a frame time on the slider 219 corresponding to the frame displayed 351 in FIG. 3.

As mentioned above, a user also can control the frame being displayed in the media display window 215 by navigating to a frame time on the slider 219. And, a location can be calculated from the frame time based on the reference data of the reference frame, a frame rate, and the track path data. Accordingly, manipulation of the first marker 220 along the slider 219 to a particular frame time can cause the location marker 208 to move along the track path to a corresponding location. For example, in FIG. 3, the first marker can be manipulated from the frame time corresponding to the frame 251 displayed in FIG. 2 to the frame time corresponding to the frame 351 displayed in FIG. 3, which in turn can cause the position marker 208 to move to a location of capture for the frame displayed in FIG. 3.

In the media content window 226, a user can select any of the four video files. A track path for the selected video file can be determined from the track data in the track file. The track path for the selected video file is displayed on the map as the video segment can be displayed in the media display window. For example, FIG. 4 shows the user interface 200 with a video file 427 selected. A track path 405, that represents the location of capture of the frames of the video segment in video file 427, is displayed on the map with the location indicator 208 corresponding to the location of capture of a video frame 451 from the video file 427 displayed in the media display window 215.

If, when a video file is selected, the extent of map 202 displayed in the map window 201 does not cover the location of the track path for the selected file, the map 202 can be panned automatically to cover the location of the track path.

Figure 5:
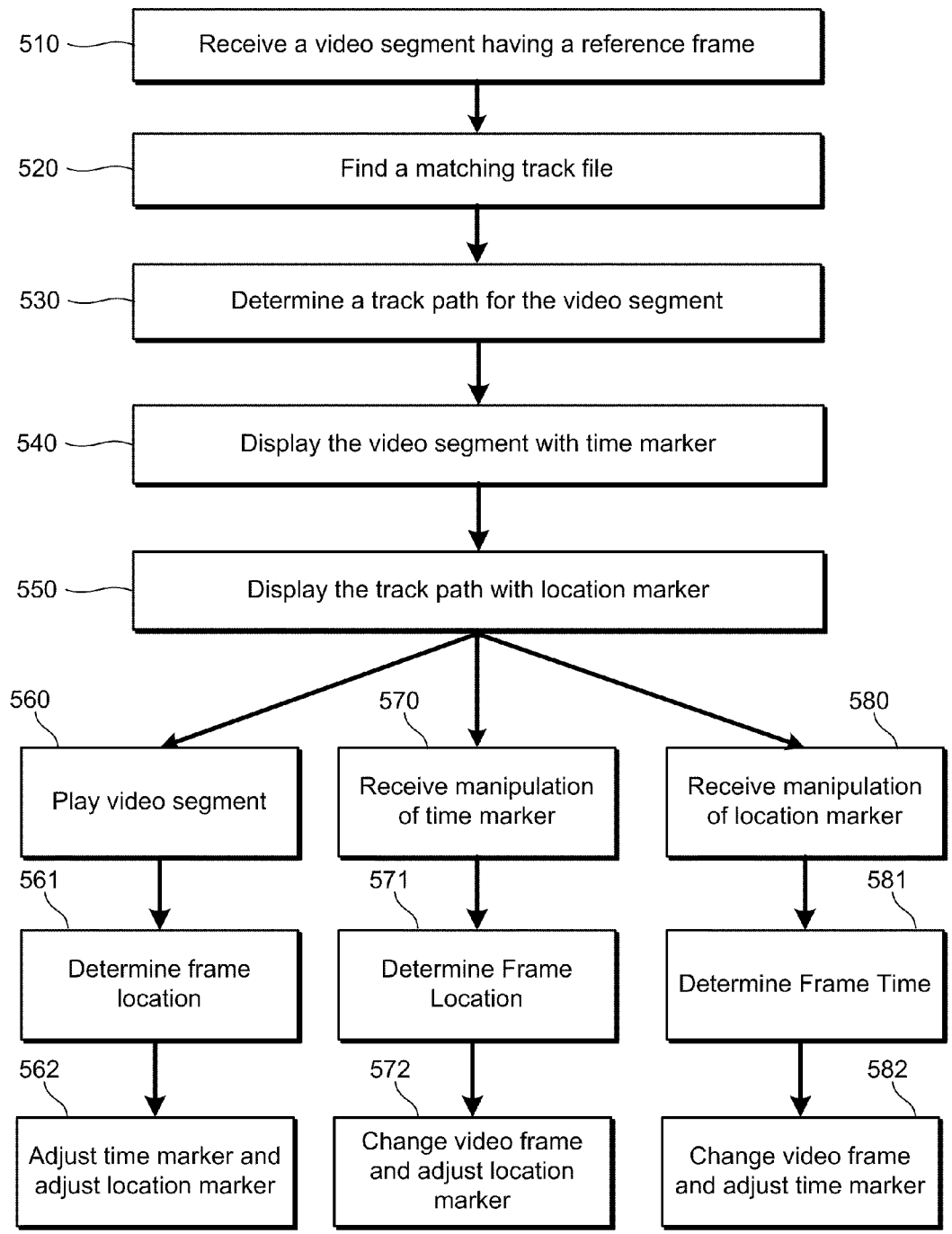
FIG. 5 shows an example process for associating locations on a geographical track path with frames of a video segment

FIG. 5 shows an example process 500 for associating locations on a geographical track path with frames of a video segment. At 510, a video segment having a reference frame is received. The reference frame can include reference data such as a time of capture of the reference frame and/or a location of capture of the reference frame. For example, the start frame in a video segment can have a start time identifying the beginning of capture of the video segment. Each of the subsequent frames has a frame time—e.g. a number for the order the frame is displayed in the video sequence. An absolute frame time can be calculated from the reference frame using a frame rate of the video segment and the time of capture of the reference frame.

At 520, a track path that matches the video segment is found. Multiple track files can be stored on a data storage device. From the multiple track files, the process 500 can find a track file that has geographical track data (e.g. a position coordinate and corresponding time coordinate) that matches when and/or where the reference frame was captured.

At 530, the process 500 determines a track path from the track file for the video segment. From the absolute frame times calculated for the start frame and an end frame of the video segment, a series of matching track data can be selected from the track. A track path can be determined based on the selected matching track data. Because the track data used for the track path may not match-up exactly with each of the frames in the video segment, a location on the track path can be interpolated for each of the frames based on the track data, the reference frame, and the frame rate of video segment.

At 540, the video segment is displayed in a user interface with a time marker for indicating the frame time of the frame displayed in the user interface. At 550, the track path for the video segment can be displayed on a map in the user interface as the video segment is displayed. The track path has a location marker for indicating the location of capture of the frame displayed in the user interface.

The time marker, the location marker, and the frame that is displayed in the video segment can all be associated with each other. For example, the video can be played at 560. As the video is played, the video frames are displayed in a sequence according to their respective frame times. From the frame time of the frame being displayed, a corresponding location of capture of the frame being displayed can be determined 561, as discussed above, based on the reference data (capture time or location of capture) of the reference frame, the frame rate, and the track data for the track path. As the video plays, the time marker changes to correspond to the frame time of the displayed video frame, and the location marker changes to represent the location of capture of the displayed video frame.

In another example, a manipulation of the time marker 570 can be received. The time marker can be manipulated to scan through the video segment. As the time marker is manipulated to a different frame time, a corresponding location of capture can be determined 571 converting the different frame time into a location based on, as discussed above, the reference data (capture time or location of capture) of the reference frame, the frame rate, and the track data of the track path. At 572, as the time marker is manipulated to a different frame time, the displayed video frame also changes to a frame corresponding to the different frame time, and the location marker moves to a location of capture for a frame corresponding to the different frame time.

In another example, a manipulation of the location marker can be received 580. For example, the location marker can be moved along the displayed track path to scan through the video segment. As the location marker is manipulated to a different location, a frame time can be determined 581 for the different location by converting the different location into a frame time. For example, a corresponding frame time can be calculated from the different location on the track path by interpolating a time coordinate corresponding to the location based on the track data and converting the interpolated time coordinate into a frame time based on the reference data of the reference frame and the frame rate. At 582, as the location marker is manipulated to a different location, the displayed video frame also changes to a frame corresponding to the different location and the time marker changes to the frame time corresponding to the different location.

Figure 6:
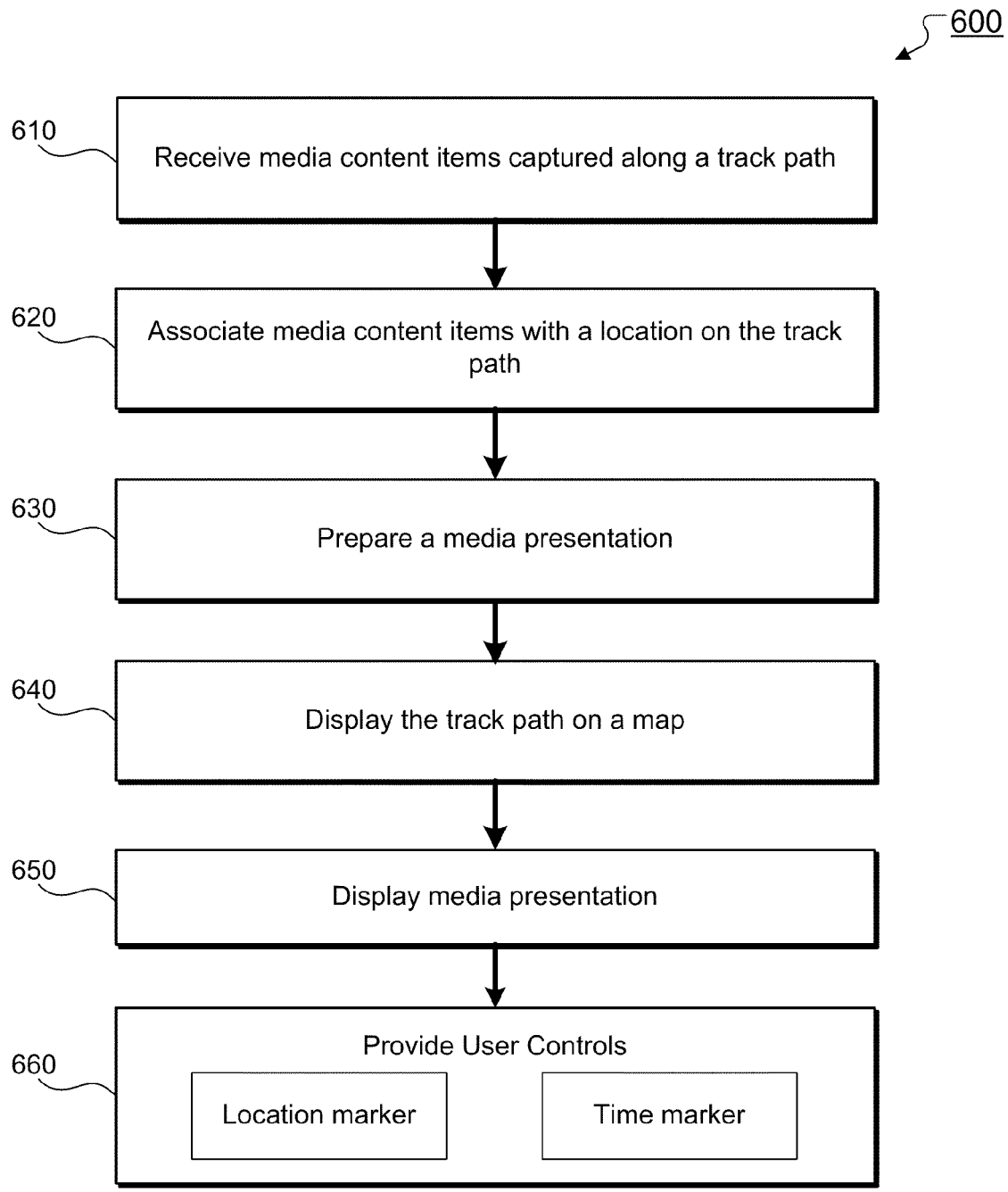
FIG. 6 shows an example process for displaying a media presentation of media content items and a geographical track path associated with the media content items.

FIG. 6 shows an example process 600 for displaying a media presentation of media content items and a geographical track path associated with the media content items. At 610, media content items captured along a track path are received. The media content items can include digital photographs and digital video segments. At 620, the media content items are associated with locations along the track path. For example, a location of capture of each of the frames of a video segment can be determined based on reference data of a reference frame (e.g. capture time or capture location of one of the frames of the video segment), frame rate, and underlying track data for the track path. Also, digital photographs can be associated with a location along the track path. For example, a location of capture along the track path can be interpolated for a digital photograph based on a time of capture of the digital photograph.

At 630, a media presentation can be prepared for the media content items by organizing the media content items into a series based on their respective locations of capture along the track path. The track path can be displayed 640 on a map, and the media presentation can be displayed 650 in a media display window. At 660, user controls can be provided for manipulating a location marker displayed on the track path and for manipulating a time marker. As the media presentation is displayed, the location marker can be displayed along the track path indicating the location of capture of the media content item displayed in the media presentation and the time marker can be displayed to indicate a time in the media presentation.

The time marker can be manipulated to navigate to a different time in the media presentation. A media content item can be displayed that corresponds to the different time. If the corresponding media content item is a video segment then the frame in the video segment corresponding to the different time can be displayed. Also, the different time in the media presentation can be converted into location of capture. Accordingly, manipulation of the time marker to a different time can cause the location marker to move to the converted location of capture.

Also, the location marker can be manipulated to navigate to a location along the track path. From the location on the track path, a time coordinate corresponding to the location on the track path can be interpolated based on the underlying track data. The time coordinate can be converted into a time in the media presentation when the media content item captured at the location is to be displayed. Accordingly, the time marker can change to the converted time in the media presentation. Also, the media presentation can also display the media content item corresponding to the converted time in the media presentation.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a machine or computer readable medium. The machine or computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular implementations have been described in this document. Variations and enhancements of the described implementations and other implementations can be made based on what is described and illustrated in this document. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
    displaying in a user interface a media presentation of a plurality of media content items and an associated geographical track path, the media content items captured in a sequence at locations along the geographical track path; and
    providing user interface controls that enable the user to manipulate a first marker associated with a location on the displayed geographical track path and to manipulate a second marker associated with a time in the media presentation, wherein manipulation of the first marker causes the second marker to move to a corresponding time in the media presentation and manipulation of the second marker causes the first marker to move to a corresponding location on the displayed geographical track path.

2. The computer implemented method of claim 1, wherein displaying an associated geographical track path comprises displaying an associated geographical track path on a map.

3. The computer implemented method of claim 1, wherein the media presentation comprises a presentation of the media content items in an order according to the sequence of capture.

4. The computer implemented method of claim 1, wherein the plurality of media content items comprise a digital photograph and a video segment.

5. The computer implemented method of claim 4,
    wherein the geographical track path is based on geographical data comprising a series of position coordinates and corresponding time coordinates that represent times when the position coordinates were recorded; and
    further comprising:
        receiving the digital photograph and a time of capture for the digital photograph, and
        associating the digital photograph with a location on the geographical track path based on the geographical data and the time of capture.

6. The computer implemented method of claim 4,
    wherein the geographical track path is based on geographical data comprising a series of position coordinates and corresponding time coordinates that represent times when the position coordinates were recorded; and
    further comprising:
        receiving the video segment which comprises video frames;
        determining a location for each of the video frames based on a start time for the video segment, a frame rate of the video segment, and the geographical data.

7. The computer implemented method of claim 1, wherein providing user interface controls that enable the user to manipulate a first marker associated with a location on the displayed geographical track path further comprises providing user interface controls that enable a user to slide the first marker along the displayed geographical track path to scan through the media presentation.

8. A non-transitory computer readable medium encoded with a computer program, the program comprising instructions that when executed by a data processing apparatus cause the data processing apparatus to perform operations comprising:

displaying, in a user interface, a video segment and an associated geographical track path that corresponds to geographical locations at which frames of the video segment were captured; and providing user interface controls that enable the user to manipulate a first marker associated with a location on the displayed geographical track path and to manipulate a second marker associated with a frame of the video segment, wherein manipulation of the first marker causes the second marker to change to a corresponding video frame for display and manipulation of the second marker causes the first marker to move to a corresponding location on the displayed geographical track path.

9. The computer readable medium of claim 8, wherein the program comprises further instructions that when executed by the data processing apparatus cause the data processing apparatus to perform operations comprising:
receiving the video segment;
receiving a series of position coordinates and corresponding time coordinates, wherein the geographical track path is based on the series of position coordinates and corresponding time coordinates; and
determining track path locations for the frames within the video segment based on a video capture starting time and a video frame rate of the video segment.

10. The computer readable medium of claim 8, wherein the program comprises further instructions that when executed by the data processing apparatus cause the data processing apparatus to perform operations comprising:
receiving the video segment, the video segment comprising a reference frame and a location of capture of the reference frame;
receiving a series of position coordinates and corresponding time coordinates, wherein the geographical track path is based on the series of position coordinates and corresponding time coordinates; and
determining track path locations for the frames within the video segment based on the location of capture of the reference frame, a video frame rate of the video segment, and the series of position coordinates and corresponding time coordinates.

11. The computer readable medium of claim 8, wherein displaying an associated geographical track path comprises displaying an associated geographical track path on a map.

12. The computer readable medium of claim 11, wherein providing user interface controls that enable the user to manipulate a first marker associated with a location on the displayed geographical track path further comprises providing user interface controls that enable a user to slide the first marker along the displayed geographical track path to scan through the video segment.

13. A non-transitory computer readable medium encoded with a computer program, the program comprising instructions that when executed by a data processing apparatus cause the data processing apparatus to perform operations comprising:
receiving a video segment comprising a series of frames;
receiving a series of data points for a track path along which the frames of the video segment were captured, each data point comprising a position coordinate and a corresponding time coordinate that represents a time when the position coordinate was recorded;
interpolating a location of capture on the track path for each of the frames based on the data points, reference data for a reference frame in the video segment, and a video frame rate of the video segment;
presenting the video segment in a user interface; and
displaying, on a map in the user interface, a portion of the track path corresponding to the location of capture of the frames, and a first marker configured to move along the track path according to the location of capture of the frame being presented.

14. The computer readable medium of claim 13, wherein the program comprises further instructions that when executed by the data processing apparatus cause the data processing apparatus to perform operations comprising receiving a timing offset to synchronize a timing of the video segment and a timing of the data points.

15. The computer readable medium of claim 13, wherein the reference data comprises a time of capture of the reference frame.

16. The computer readable medium of claim 13, wherein the reference data comprises a location of capture of the reference frame.

17. The computer readable medium of claim 13,
wherein the first marker is configured to be selected and moved along the portion of the track path; and
wherein presenting the video segment in a user interface comprises presenting the video frames according to the location of first marker along the track path.

18. The computer readable medium of claim 17, wherein the program comprises further instructions that when executed by the data processing apparatus cause the data processing apparatus to perform operations comprising:
displaying a second marker for indicating frame time in the video segment; and
determining a frame time corresponding to the location of the first marker along the track path, wherein moving the first marker causes the second marker to change to the corresponding frame time.

19. The computer readable medium of claim 13, wherein the program comprises further instructions that when executed by the data processing apparatus cause the data processing apparatus to perform operations comprising:
displaying a second marker for indicating frame time in a video segment, wherein manipulation of the second marker causes the first marker to move to a corresponding location on the displayed track path.

20. The computer readable medium of claim 13, wherein the program comprises further instructions that when executed by the data processing apparatus cause the data processing apparatus to perform operations comprising:
determining the portion of the track path corresponding to the location of capture of the frames based on a time of capture of the reference frame and the frame rate.

21. The computer readable medium of claim 13, wherein the program comprises further instructions that when executed by the data processing apparatus cause the data processing apparatus to perform operations comprising:
receiving a selection of a second video segment; and
interpolating a location of capture on the track path for each of the frames of the second video segment based on the data points, reference data for a reference frame in the second video segment, and a video frame rate;
presenting the second video segment in a user interface;
displaying a second portion of the track path corresponding to the second video segment on the map.

22. The computer readable medium of claim 21, wherein the program comprises further instructions that when executed by the data processing apparatus cause the data processing apparatus to perform operations comprising panning the map to include the location of capture of each of the video frames of the second video segment.

23. A system comprising:
a memory device for storing media content items and geographical track data;
a computing system including processor electronics configured to perform operations comprising:
associating media content items with locations of capture along a track path, the track path based on the stored geographical track data;
preparing a media presentation of the media content items in a series corresponding to locations of capture of the media content items along the track path;
displaying, on a display device associated with a computer, the media presentation;
displaying the track path on the map in the display device; and
providing user controls including a location marker associated with a location on the track path and a time marker associated with a time in the media presentation, wherein manipulation of the location marker to a first location on the track path causes the time marker to move to a corresponding time in the media presentation and manipulation of the time marker to a first time in the media presentation causes the location marker to move to a corresponding location on the track path.

24. The system of claim 23,
wherein the first time in the media presentation corresponds to a frame in a video segment; and
the processor electronics further configured to perform the operations comprising:
determining the corresponding location on the track path based on the first time, a reference frame in the video segment, and a frame rate of the video segment; and
displaying the frame.

25. The system of claim 23,
wherein the corresponding time in the media presentation corresponds to a frame in a video segment; and
the processor electronics further configured to perform the operations comprising:
determining the corresponding time from the first location on the track path by determining an interpolated time coordinate for the first location based on the track data and converting the interpolated time coordinate into the corresponding time in the media presentation based on a reference frame of the video segment and a frame rate of the video segment; and
displaying the frame.

\* \* \* \* \*